Aug. 18, 1959   J. L. PATTON ET AL   2,900,324
TWO STAGE FLUIDIZED CATALYTIC CONVERSION SYSTEM
WITH MULTIPLE STRIPPING ZONES
Filed June 6, 1956
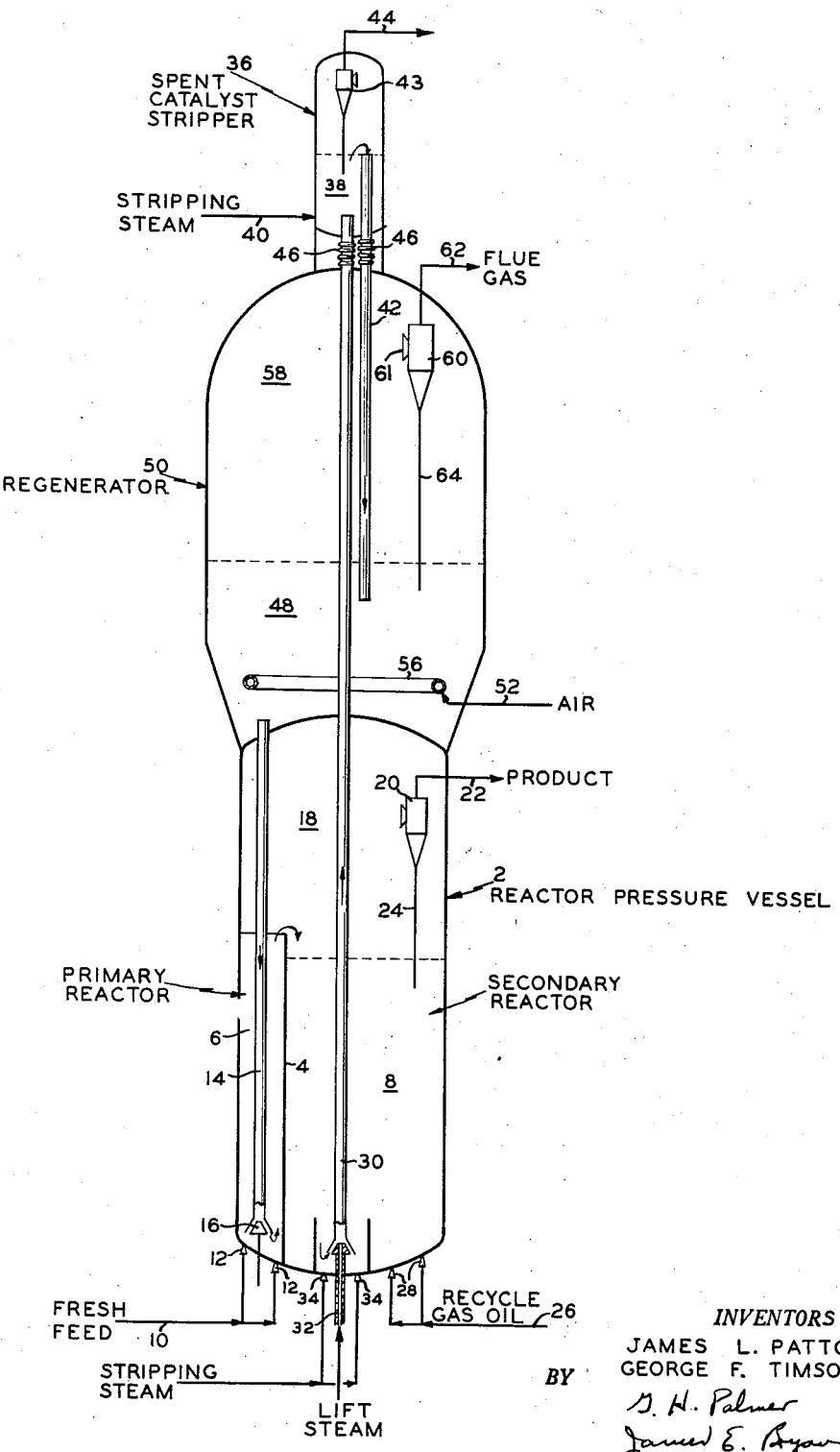
INVENTORS
JAMES L. PATTON
GEORGE F. TIMSON
BY
ATTORNEYS

United States Patent Office 2,900,324
Patented Aug. 18, 1959

2,900,324

TWO STAGE FLUIDIZED CATALYTIC CONVERSION SYSTEM WITH MULTIPLE STRIPPING ZONES

James L. Patton, Ramsey, N.J., and George F. Timson, Alton, Ill., assignors to The M. W. Kellogg Company, Jersey City, N.J., a corporation of Delaware Application June 6, 1956, Serial No. 589,613

12 Claims. (Cl. 208—74)

This invention relates to an improved process and apparatus for converting hydrocarbons, and more particularly it relates to a process and apparatus for catalytically cracking high boiling hydrocarbons to gasoline of high anti-knock quality.

In accordance with the present invention, a process is provided for conducting chemical reactions in which a vaporous chemical reactant is contacted with a dense fluidized bed of finely divided catalytic material in a first reaction zone from which finely divided catalytic material is transferred to a second fluidized bed of catalytic material in a second reaction zone. A vaporous chemical reactant is contacted with the second fluidized bed of catalytic material in the second reaction zone, this chemical reactant being the same as or different than the chemical reactant contacted with the catalytic material in the first reaction zone.

In both of the reaction zones a reaction product is produced and the catalyst is contaminated with carbonaceous material and, accordingly, a portion of the contaminated catalyst is withdrawn from the second fluidized bed and passed upwardly through a spent catalyst riser as a suspension in a stripping gas such as steam. The spent, partially stripped catalyst is discharged from the spent catalyst riser into a spent catalyst stripper, which is mounted on top of a regenerator, which is in turn mounted on top of the reactor, the latter containing the two reaction zones previously described. In the spent catalyst stripper, the partially stripped catalyst is further stripped by the introduction of additional stripping steam into a dense phase bed of catalyst in the stripper and stripped catalyst is withdrawn from the stripper and introduced into the regenerator at a point below the level of the dense phase bed of catalyst therein. The catalyst in the regenerator is regenerated by contacting it with an oxygen containing gas, such as air, and the regenerated catalyst is then transferred into the reactor, preferably into the primary reactor or first reaction zone, through a regenerated catalyst standpipe. If desired, however, the regenerated catalyst standpipe may extend from the regenerator into the secondary reactor or second reaction zone or a plurality of standpipes may be utilized which discharge simultaneously into both zones.

In some systems the rate of deposition of carbonaceous material on the catalyst is small and, consequently, a low catalyst circulation rate is used. The present invention is particularly applicable to a system in which 1.0 cubic foot of oxygen containing gas, i.e., air (measured at 60° F. and 760 mm. Hg), is required per pound of catalyst being circulated or generally about 0.3 to 3 cubic feet per pound of catalyst.

In the process of this invention, fresh feed is contacted in a primary reactor or first reaction zone with regenerated catalyst and cracked at a temperature in the range of 900 to 1025° F., preferably between 950 to 1000° F., using a high weight space velocity in the range of about 2 to 20, the weight space velocity being defined as the quantity of oil which is processed per hour relative to the quantity of catalyst which is present in the reaction zone. Conditions in the primary reactor resemble those occurring in a transfer line in that the vapor velocity is approximately 3 to 20 feet per second and the fluid density is low, i.e., in the range of about 10 to 30 pounds per cubic foot.

In the primary reactor, the easily cracked portion of the feed stock is converted while cycle oil from the primary and secondary cracking reactions is cracked in the secondary reactor or secondary reaction zone. The cracking temperature in the secondary reactor may be between about 850 to about 950° F. and the reaction pressure, in both zones, is maintained in the range of about 10 to about 50 p.s.i.g., preferably about 15 to 25 p.s.i.g. The weight space velocity of cycle oil charged to the secondary reactor may be about 0.25 to about 15, preferably about 0.4 to about 5. The catalyst to oil ratio on a weight basis falls within the range of about 2 to about 25, preferably about 10 to about 20.

As a result of catalytically cracking the high boiling hydrocarbon oils, carbonaceous material is deposited on the catalyst and a portion of the spent catalyst is withdrawn from the secondary reactor into a first stage stripper, which is a well surrounding the lower end of the spent catalyst riser. The first stage stripper can be a vertical cylindrical vessel positioned concentrically about the riser but of larger diameter. It may or may not extend above the level of the dense phase bed of catalyst in the secondary reactor. When the first stage stripper is of a height such as that it does extend above the level of the dense phase bed, catalyst is transferred into the stripper from the dense phase bed in the secondary reactor through louvers or ports in the wall of the stripper, and in this embodiment the stripping gas does not contact the dense phase bed in the secondary reactor but instead passes out of the reactor commingled with the products of reaction by being discharged directly into the dilute phase in the reactor from the stripping well. In cases where the stripping well does not extend above the level of the dense phase bed of catalyst, the stripping steam introduced into the bottom of the well passes into the fluidized bed of catalyst in the secondary reactor before it mixes with the products of reaction in the dilute phase. The stripper may have a diameter which is about 25 to 75 percent, preferably about 40 to 60 percent, of the reactor diameter and it may have from 20 to 100 percent of the height of the reactor. As a stripping agent may be used steam, hydrogen or normally gaseous hydrocarbons, such as ethane, methane, propane and the like.

From the first stage stripper or stripping well, the spent, partially stripped catalyst is conveyed by means of a lift gas, such as steam, into a third stage stripper which is mounted on top of the regenerator, which is interposed between the stripper and the reactor. In the spent catalyst riser, a second stage of stripping occurs at a temperature of about 850 to 950° F. The fluid density in the riser may be in the range of about 5 to 30 pounds per cubic foot and the velocity in the riser is about 5 to 40 feet per second. A third stage of stripping occurs in the spent catalyst stripper, into which the spent catalyst riser discharges. The spent catalyst stripper is maintained under a slight superatmospheric pressure in the range of about 0.1 to 10.0 p.s.i.g. and additional stripping steam is introduced below the level of the dense phase bed of catalyst maintained therein. From the dense phase bed, stripped catalyst overflows into a standpipe through which it is transferred to the regenerator and is introduced into the regenerator at a point below the level of the dense phase bed of catalyst maintained therein. Thus, from the foregoing it is apparent that the present invention results in improved stripping efficiency since three stages of stripping are provided and the final stripper, or third stage of stripping, is operated at a low pressure.

In the regenerator, the catalyst is regenerated by contacting it with an oxygen containing gas, such as air or diluted air, at a temperature of about 700 to 1200° F., generally about 1000 to about 1150° F. The pressure in the regenerator may be in the range of about 4 to 40 p.s.i.g., preferably about 5 to 15 p.s.i.g. The regenerated catalyst is then returned to the primary or secondary reactor, or both, through one or more regenerated catalyst standpipes.

The high boiling hydrocarbon oils which are especially adapted for use as fresh feed to the primary reactor, or first reaction zone, have an initial boiling point of about 400 to about 600° F., an end point of about 700 to about 1300° F. and an API gravity of about 10 to about 40°, these hydrocarbons being, for example, gas oils, reduced crudes, residual oils, heavy distillates, and the like. The feed to the secondary reactor or second reaction zone may also be a fresh feed, but it is preferably a cycle oil having an initial boiling point of about 400 to about 700° F., an end point of about 800 to about 1400° F. and an API gravity in the range of about 5 to about 35°.

The cracking catalyst may be a siliceous material containing about 70 to 90 percent by weight of silica with the remainder being one or more of other suitable materials such as alumina, boria, magnesia, zirconia, and the like.

In this type of system the regenerator generally has a diameter about 1 to 3 times as great as the diameter of the reactor and both vessels have a length to diameter ratio falling in the range of about 1 to 4. Generally, about 5 to 15 pounds of catalyst per hour are being circulated per pound of catalyst present in the combined reaction zones. Further the apparatus employed to effect the process of the invention can be of either the single or double head type, the latter being the type of construction in which the regenerator is positioned above the reactor in such a manner that air can be circulated between the vessels. In the double head system, the two vessels are connected by means of a structure in the form of an inverted truncated cone, containing suitable openings for the passage of air. The single head system is more economical and structurally superior in cases where the regenerator is not more than about 25 feet in diameter since below diameters of 25 feet the metal expansion incurred can be accommodated by using metal thicknesses in the vessel structure which can be fabricated and handled without excessive cost and without unreliable vessel quality.

Generally, the regenerator contains more catalyst than does the reactor and the regenerator catalyst bed generally contains about 1.5 to 5 times as much catalyst on a weight basis as does the reactor catalyst bed.

Referring to the accompanying drawing, in which one embodiment of the present invention is diagrammatically shown in elevation, the apparatus of the invention comprises a reactor 2 which is separated into primary and secondary reactors, or reaction zones, by means of the wall 4 mounted within the reactor and extending from the bottom thereof to a point slightly above the midpoint of the reactor 2. The reactor 2 is accordingly divided into primary and secondary reaction zones 6 and 8 respectively, each of the zones having a separate dense phase bed of catalyst therein. Fresh feed is introduced through the line 10 and the nozzles 12 into the bottom of the primary reaction zone 6.

The fresh feed introduced through the nozzles 12 admixes with a fluidized bed of catalyst in the primary reaction zone 6, this fluidized bed containing regenerated catalyst introduced into the bottom thereof through the standpipe 14, the flow of catalyst into the fluidized bed in the first reaction zone being regulated by the conventional plug valve 16. As the mixture of fresh feed and fluidized catalyst moves upwardly in the first reaction zone, the catalyst spills over the wall 4 and is transferred into the second dense bed 8, while the cracked products pass into the dilute phase 18 and then to product recovery through the cyclone separator 20, to which the product line 22 is connected. Entrained catalyst in the cracked products is returned to the second stage catalyst bed through the dipleg 24.

The fluid bed of catalyst in the secondary reactor or second reaction zone 8 is contacted with recycle gas oil which is introduced through the line 26 and the nozzles 28. Vaporous cracked products, mixed with the vaporous cracked products from the first reaction zone, pass out of the reactor 2 through the cyclone separator 20 and the product line 22. From the foregoing, it is apparent that while segregated cracking of different feed stocks is accomplished in the same reactor, the products from the separate cracking zones are withdrawn as a mixture from the common dilute phase of the reaction zones.

From the secondary reaction zone 8 spent catalyst is withdrawn by passing it upwardly in the spent catalyst riser 30, into which lift steam is introduced through the hollow plug valve 32. Before entering the riser the catalyst is subjected to a preliminary stripping treatment by contacting it with steam introduced through the nozzles 34. The partially stripped, spent catalyst is lifted through the riser 30 to the stripper 36, having the dense phase bed of catalyst 38 therein. Stripping steam is introduced at a point near the bottom of the dense bed through the line 40 and the stripped catalyst overflows from the dense bed 38 into the conduit 42, by means of which it is transferred to the regenerator. The stripper is maintained under only a slight pressure and the stripping gas, together with material stripped from the catalyst, is removed overhead through one or more cyclones 43 and the line 44. Suitable expansion joints 46 are provided in both the spent catalyst riser 30 and the stripped catalyst conduit 42 where they pass between the top of the regenerator and the bottom of the stripper.

The stripped catalyst is discharged from the conduit 42 at a point below the level of the dense phase bed 48 of catalyst in the regenerator 50. Regeneration gas is introduced into the regenerator 50 through the line 52 which connects to the circular distribution pipe 56, the latter having a plurality of apertures therein for the uniform distribution of regeneration gas throughout the fluidized bed 48. A mixture of flue gas and entrained catalyst passes into the dilute phase 58 from the regenerator 50 and then into the cyclone separator 60 through inlet 61 from which the flue gas is discharged through the line 62, and the entrained catalyst is returned to the dense phase bed through the dipleg 64. The regenerated catalyst is then returned to the reactor through the standpipe 14 although there may be one or more standpipes which may extend simultaneously into the reaction zones 6 and 8 or into one or the other of the reaction zones, as desired.

The invention will be further illustrated by reference to the following specific example:

EXAMPLE 1

This example illustrates the operating conditions suitable for use in the fluid catalytic cracking system of this invention adapted to process 8660 barrels per day of heavy gas oil, i.e., a feed having an API gravity of 26.5°, coke=8.0 weight percent, at a throughput to fresh feed volume ratio of 1.65 and a fresh feed conversion of 72 volume percent.

*Table 1*

Reactor:

| | |
|---|---|
| Length, feet | 40 |
| Diameter, feet | 16 |
| L/D ratio | 2.5 |

First stage reaction zone:
- Length, feet _____ 24
- Area, square feet _____ 40
- L/D ratio _____ 3.4
- Temperature, °F. _____ 975–1000 (1000 normal)
- Space velocity _____ 5.0
- Catalyst to oil ratio, Wo./hr./Wc. _____ 10.2
- Pressure, p.s.i.g. _____ 17.0
- Density of catalyst, vapor mixture _____ 25
- First reaction zone pressure drop, p.s.i. _____ 3.5
- Catalyst holdup in first reaction zone, tons _____ 11.35
- Superficial velocity of vapors leaving zone, F/S _____ 3.7

Second stage reaction zone:
- Length, feet _____ 26
- Area, square feet _____ 155
- L/D ratio _____ 1.85
- Temperature, °F. _____ 900–950 (930 normal)
- Space velocity _____ 0.6
- Catalyst to oil ratio, Wo./hr./Wc. _____ 19.2
- Pressure, p.s.i.g. _____ 17.0
- Density of catalyst, vapor mixture _____ 35
- Second reaction zone pressure drop, p.s.i _____ 4.9
- Catalyst holdup in second reaction zone, tons _____ 64.0
- Superficial velocity of vapors leaving zone, F/S _____ 0.57

Spent catalyst riser:
- Temperature, °F. _____ 930
- Length, feet _____ 87
- Diameter, feet _____ 1.7
- Catalyst density, lbs./cu. ft. _____ .21
- Catalyst velocity, feet per second (average) _____ 9.0
- Steam rate, lbs./1000 lbs. cat. circulation _____ 2.0

Spent catalyst stripper:
- Length, feet _____ 15 (bed only)
- Diameter, feet _____ 9
- L/D ratio _____ 1.67
- Steam rate, lbs./1000 lbs. cat. circulation _____ 1.5
- Catalyst holdup in stripper, tons _____ 20.5
- Temperaure, °F. _____ 930
- Pressure, p.s.i.g. _____ 1.0

Regenerator:
- Length, feet _____ 15.0 (bed only)
- Diameter, feet _____ 23.0
- L/D raito _____ 0.65
- Temperature, °F. _____ 1100
- Pressure, p.s.i.g. _____ 8.2
- Catalyst density, lbs./cu. ft. _____ 40
- Gas velocity, feet per second _____ 2.25
- Catalyst holdup, tons _____ 123.5

Regenerated catalyst transfer line system:
- Standpipe catalyst density, lbs./cu. ft. _____ 40
- Standpipe catalyst pressure head, p.s.i. _____ 11.1
- Standpipe catalyst velocity (average) _____ 5.0
- Standpipe valve pressure drop, p.s.i _____ 3.0

It will be obvious to those skilled in the art that many modifications may be made within the scope of the present invention without departing from the spirit thereof, and the invention includes all such modifications.

We claim:

1. A unitary vessel comprising in combination a lower reaction chamber, an intermediate regeneration chamber and an upper stripping chamber, said reactor chamber having first and second substantially vertical reaction compartments therein in open communication with one another in the upper portion thereof, means for transferring catalyst from said first compartment to said second compartment, means for transferring catalyst from said second compartment substantially vertically upward to said stripper compartment, means for passing catalyst from said stripper compartment to said regeneration compartment, means for transferring catalyst from said regeneration compartment substantially vertically downward to the lower portion of said first reaction compartment, means for introducing a chemical reactant into the lower portion of said first compartment, and means for introducing a chemical reactant into the lower portion of said second compartment.

2. A conversion apparatus comprising in combination a reactor chamber having at least two separate reaction compartments therein, means for passing a reactant and finely divided catalyst upwardly through a first reaction compartment, means for transferring finely divided catalyst material from the upper portion of said first reaction compartment to a second reaction compartment adjacent thereto, said compartment being in open communication with one another in the upper portion thereof, a substantially vertical catalyst riser conduit for transferring finely divided catalyst material from the lower portion of said second reaction compartment to a stripper chamber positioned above said reactor chamber, means for transferring finely divided catalyst material substantially vertically downward from said stripper chamber to a regenerator chamber positioned below said stripper chamber but above said reactor chamber, means for transferring finely divided catalyst material substantially vertically downward from said regenerator chamber to the lower portion of said first compartment, means for introducing a chemical reactant into the lower portion of said first compartment for upward passage therethrough with finely divided catalyst material, and means for introducing a chemical reactant into the lower portion of said second compartment.

3. An integral vessel comprising in combination a reactor compartment superimposed by a regeneration compartment and a stripper compartment, said reactor compartment divided into a first and second reaction chamber, means for transferring finely divided catalyst from the upper portion of said first reaction chamber to said second reaction chamber, means for maintaining a dense fluidized bed of finely divided catalyst in said second reaction chamber, a catalyst riser conduit for transferring finely divided catalyst from the lower portion of said second reaction chamber substantially vertically upward through said regeneration compartment to said stripper compartment positioned above said regeneration compartment, means for transferring catalyst from said stripper compartment to said regenerator compartment, a substantially vertical standpipe for transferring catalyst from the lower portion of said regenerator compartment downwardly through said first reaction chamber to the lower portion thereof, means for introducing a chemical reactant into said first reactor chamber and means for introducing a chemical reactant into said second reactor chamber.

4. A unitary vessel comprising in combination a reactor chamber having a plurality of reaction compartments therein, said reaction compartments in open communication with one another in the upper portion thereof, means for transferring catalyst upwardly through said first reaction compartment, means for passing catalyst from the upper portion of said first reaction compartment to a second reaction compartment, means for maintaining a dense fluidized bed of catalyst in said second reaction compartment, a substantially vertical catalyst riser conduit for transferring finely divided catalyst from the lower portion of said second zone to a stripping chamber positioned above said reactor chamber, a regenerator chamber intermediately disposed between said stripper chamber and said reactor chamber, means for transferring catalyst substantially vertically from said stripping chamber to said regenerator chamber, a standpipe for transferring finely divided catalyst downwardly from said regenerator chamber to the lower portion of said first reaction compartment, means for introducing a chemical reactant into the first reaction compartment, means for introducing a chemical reactant into the second reaction compartment, a first stripping means for stripping finely divided catalyst in the lower portion of said second reaction compartment and means for passing catalyst from said first stripping means in said second reaction compartment upwardly through said catalyst riser conduit.

5. A conversion apparatus comprising a reactor chamber having at least two vertically disposed reaction compartments therein, means for transferring finely divided catalyst from the upper portion of a first reaction compartment to a second reaction compartment, a catalyst riser conduit for transferring finely divided catalyst substantially vertically upward from said second compartment to a stripper chamber above said reactor chamber, means for introducing additional stripping medium into said stripper chamber, transfer means for transferring catalyst from the upper portion of said stripper chamber substantially vertically downwardly to a regenerator chamber positioned above said reactor chamber, a substantially vertical standpipe for transferring catalyst from the lower portion of the regenerator chamber to the lower portion of said first reaction compartment, means for introducing a chemical reactant into the lower portion of each of said reaction compartments and means for introducing a regeneration gas into the lower portion of said regenerator chamber.

6. A conversion process which comprises passing a chemical reactant with finely divided catalyst upwardly through a first reaction zone under conversion conditions, separating products of reaction from separated catalyst and transferring said catalyst from the upper portion of said first reaction zone to a dense fluidized bed of catalytic material in a second reaction zone adjacent to said first reaction zone, passing a chemical reactant upwardly through said dense fluidized catalyst bed in said second reaction zone, withdrawing contaminated catalyst from said dense fluidized bed and passing the same upwardly as an elongated confined stream through said second reaction zone to a stripping zone positioned above a regeneration zone, stripping said catalyst in said stripping zone, passing stripped catalyst substantially vertically downwardly as a confined stream to said regeneration zone, regenerating the stripped catalyst in said regeneration zone and passing the regenerated catalyst downwardly as a confined stream to the lower portion of said first reaction zone.

7. A hydrocarbon conversion process which comprises passing a vaporous hydrocarbon upwardly with fluidized catalytic material through a first elongated confined reaction zone, separating and transferring catalyst from the upper portion of said first reaction zone to the upper portion of a dense fluidized bed of catalytic material in a second reaction zone, passing a vaporous hydrocarbon upwardly through said dense fluidized catalyst bed in said second reaction zone, withdrawing contaminated catalyst from the lower portion of said dense fluidized catalyst bed and passing the same upwardly through an elongated confined zone through a regeneration zone above said reaction zones to a stripping zone above said regeneration zone, stripping catalyst in said stripping zone, passing said stripped catalyst to said regeneration zone, regenerating the catalyst in said regeneration zone, passing the regenerated catalyst from the lower portion of said regeneration zone downwardly as a confined stream through said first reaction zone to the lower portion thereof and recovering a mixture of conversion products from the first and second reaction zones as a product of the process.

8. A hydrocarbon conversion process which comprises passing a vaporous hydrocarbon upwardly with finely divided catalytic material through a first reaction zone, separating finely divided catalyst from said hydrocarbon material in the upper portion of said first reaction zone and transferring catalyst from the upper portion of said first reaction zone to the upper portion of a dense fluidized bed of catalytic material in a second reaction zone adjacent to said first reaction zone, introducing a vaporous hydrocarbon into the lower portion of said dense fluidized bed and passing the same upwardly therethrough, withdrawing contaminated catalyst from the lower portion of said dense fluidized bed and passing the same substantially vertically upwardly through said second reaction zone as an elongated confined stream to a stripping zone, stripping catalyst in said stripping zone, passing the stripped catalyst downwardly into a regeneration zone, regenerating the catalyst in said regeneration zone, removing regenerated catalyst from the lower portion of said regeneration zone and passing the same substantially vertically downwardly as a confined stream to the lower portion of said first reaction zone and recovering a mixture of conversion products from the first and second reaction zones as a product of the process.

9. A catalytic cracking process which comprises passing a vaporous hydrocarbon material and finely divided fluidized catalyst upwardly through a first reaction zone under cracking conditions whereby the catalyst becomes contaminated with carbonaceous deposits, separating catalyst from products of reaction in the upper portion of said first reaction zone, transferring said separated catalyst from the upper portion of said first reaction zone to the upper portion of a dense fluidized bed of cracking catalyst in a second reaction zone adjacent to said first reaction zone and in open communication with one another in the upper portion thereof, passing a vaporous hydrocarbon upwardly through said dense fluidized bed of catalyst in said second reaction zone under conversion conditions whereby the catalyst becomes spent due to carbonaceous deposits thereon, withdrawing spent catalyst from said dense fluidized bed and passing the same downwardly through a first stripping zone, partially stripping the catalyst in said first stripping zone, passing partially stripped catalyst from the lower portion of said first stripping zone upwardly as a suspension in a gaseous material through an elongated confined second stripping zone to a third stripping zone, stripping catalyst in said third stripping zone in a dense fluidized condition, passing stripped catalyst from said third stripping zone substantially vertically downwardly as a confined stream into a regeneration zone, regenerating the catalyst in said regeneration zone, passing regenerated catalyst from the lower portion of said regeneration zone substantially vertically downwardly as a confined stream through said first reaction zone to the lower portion thereof and recovering a mixture of cracked products from the first and second reaction zones as a product of the process.

10. A process according to claim 9 in which the hydrocarbon passed into said first reaction zone is fresh hydrocarbon feed and the hydrocarbon passed into said second reaction zone is recycle stock.

11. A unitary apparatus comprising in combination a lower reaction chamber, an intermediate regeneration chamber and a first upper stripping chamber, said reaction chamber divided in the lower portion thereof by a substantially vertical baffle means into a first reaction compartment and a second reaction compartment, a second elongated substantially vertical stripping chamber positioned in said second reaction compartment and in open communication therewith in the upper portion thereof, a first substantially vertical elongated open end conduit extending upwardly from the lower portion of said second stripping chamber into said first upper stripping chamber, a second elongated open end substantially vertical conduit extending from said upper stripper chamber downwardly into said regeneration chamber, a third substantially vertical elongated open end conduit extending downwardly from said regeneration chamber through said first reaction compartment into the lower portion thereof, means for introducing a reactant material into the lower portion of each of said reaction compartments, means for introducing a lift gas to the lower portion of said first conduit, means for introducing stripping gas to said stripping chamber, means for removing products of reaction from the upper portion of said reaction chamber, means for introducing regeneration gas to the lower portion of said regeneration chamber for contact with a dense fluidized bed of catalyst therein, means for removing regeneration effluent gases from the upper portion of said regeneration chamber, and means for removing stripped products of reaction from the upper portion of said upper stripping chamber.

12. A method for handling finely divided catalytic material in a process involving the conversion of hydrocarbons, stripping catalyst of reaction products and regeneration of contaminated catalyst which comprises passing a first hydrocarbon reactant admixed with finely divided catalyst as a suspension upwardly through a first reaction zone, separating products of said first reaction zone from entrained catalyst and passing the separated catalyst to a dense fluidized bed of catalyst in a second reaction zone, passing a second hydrocarbon reactant in contact with the dense fluidized bed of catalyst in the second reaction zone under conversion conditions, recovering a combined product of said first and second reaction zones from the upper portion of said second reaction zone, passing catalyst from said dense fluidized bed of catalyst downwardly through a first stripping zone positioned within said second reaction zone, withdrawing partially stripped catalyst from the lower portion of said first stripping zone and passing said withdrawn, partially stripped catalyst admixed with a gaseous material substantially vertically upwardly as a confined stream through said first stripping zone to the lower portion of a fluid bed of catalyst in a second stripping zone positioned above said first and second reaction zones, maintaining a dense fluidized bed of catalyst in said second stripping zone by passing additional stripping gas upwardly therethrough in contact with the catalyst in said second stripping zone, withdrawing stripped catalyst from the upper portion of the fluid bed of catalyst in the second stripping zone and passing the same substantially vertically downwardly as a confined stream to a fluid bed of catalyst in a regeneration zone, regenerating catalyst in said regeneration zone, withdrawing regenerated catalyst from the lower portion of the regeneration zone and passing the same substantially vertically downwardly as a confined stream to the lower portion of said first reaction zone.

References Cited in the file of this patent

UNITED STATES PATENTS

| | | |
|---|---|---|
| 2,363,874 | Krebs | Nov. 28, 1944 |
| 2,377,657 | Watts | June 5, 1945 |
| 2,391,336 | Ogorzaly | Dec. 18, 1945 |
| 2,439,582 | Scheineman | Apr. 13, 1948 |
| 2,488,032 | Johnson | Nov. 15, 1949 |
| 2,595,909 | Trainer et al. | May 6, 1952 |
| 2,658,822 | Hengstebeck | Nov. 10, 1953 |
| 2,695,866 | McGrath | Nov. 30, 1954 |
| 2,710,279 | Siecke | June 7, 1955 |
| 2,735,803 | Leffer | Feb. 21, 1956 |
| 2,758,066 | Brackin | Aug. 7, 1956 |
| 2,799,359 | Johnson | July 16, 1957 |

UNITED STATES PATENT OFFICE
CERTIFICATE OF CORRECTION

Patent No. 2,900,324                                                          August 18, 1959

James L. Patton et al

It is hereby certified that error appears in the printed specification of the above numbered patent requiring correction and that the said Letters Patent should read as corrected below.

Column 6, line 63, for "zone" read -- reaction compartment --.

Signed and sealed this 5th day of April 1960.

(SEAL)
Attest:

KARL H. AXLINE                                                      ROBERT C. WATSON
Attesting Officer                                             Commissioner of Patents